United States Patent [19]

Miller et al.

[11] Patent Number: 5,907,648
[45] Date of Patent: May 25, 1999

[54] AIMABLE-BEAM FIBER-OPTIC SPOTLIGHT LUMINAIRE

[76] Inventors: Jack V. Miller; Ruth Ellen Miller, both of R.R. 4 Box 748, Seaford, Del. 19973

[21] Appl. No.: 08/911,624

[22] Filed: Aug. 15, 1997

[51] Int. Cl.⁶ ..................................................... G02B 6/32
[52] U.S. Cl. ..................... 385/33; 385/35; 385/147; 385/901; 362/560
[58] Field of Search ........................... 385/33, 32, 35, 385/115, 116, 119, 120, 147, 901; 362/32, 560

[56] References Cited

U.S. PATENT DOCUMENTS

| | | | |
|---|---|---|---|
| 3,652,848 | 3/1972 | Miller et al. | 240/81 |
| 4,822,292 | 4/1989 | Miller et al. | 439/207 |
| 5,050,047 | 9/1991 | Viner | 362/32 |
| 5,268,977 | 12/1993 | Miller | 385/33 |
| 5,303,125 | 4/1994 | Miller | 362/32 |
| 5,384,881 | 1/1995 | Miller | 385/115 |
| 5,486,984 | 1/1996 | Miller | 362/32 |

FOREIGN PATENT DOCUMENTS 218 8099    6/1972    France ........................... F21Q 3/00

*Primary Examiner*—Phan T. H. Palmer

[57] ABSTRACT

An aimable fiber-optic spotlight has a fiber-optic light guide with a first end receiving light from a remote light source and a second end emitting light at the focus of a beam-forming lens held in a fixed tubular housing having a lens on a central optical axis. The light-emitting end of the light guide is held in a tubular light guide retainer within the housing, and which is transversely adjustable off the central axis of the housing and lens. Light emitted from the light guide is off the central axis of the housing and lens, and is thus projected through the lens as an off-axis beam adjustable in elevation angle. Rotation of housing in azimuth can then aim the light beam anywhere within a cone inscribed by rotation of the off-axis beam angle, thus providing adjustment in both elevation and azimuth. In a preferred embodiment the light-emitting end of the light guide is axially adjustable with respect to the lens, whereby the angular diameter of the projected light beam is also adjustable.

4 Claims, 1 Drawing Sheet

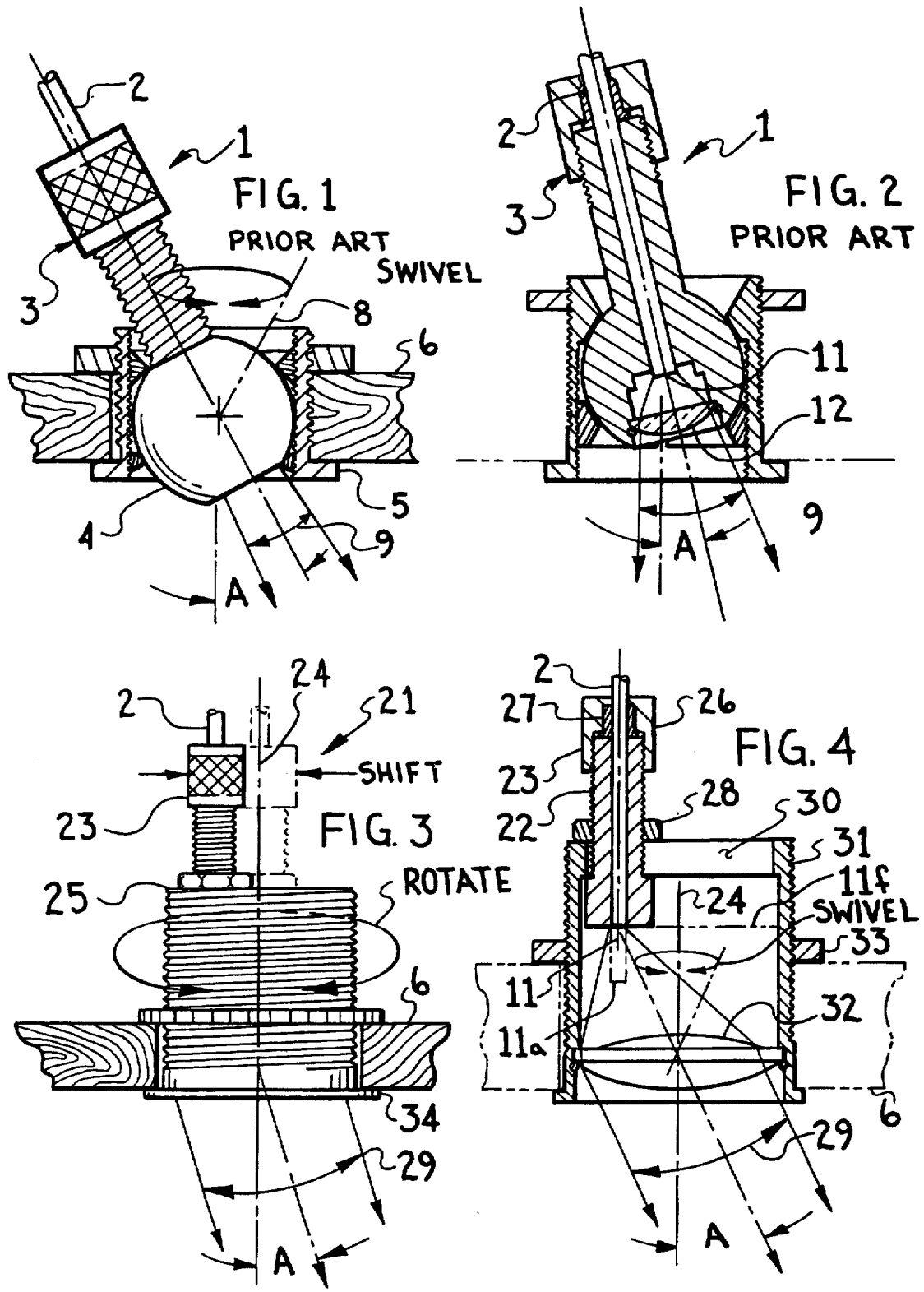

5,907,648

1
AIMABLE-BEAM FIBER-OPTIC SPOTLIGHT LUMINAIRE

BACKGROUND

1. Field of the Invention

This invention applies to the field of lighting spotlights capable of being mounted to a rigid surface, such as a ceiling or wall, and being aimable to direct a light beam at an object; and more particularly to rigidly-mounted fiber optic spotlights capable of aiming a light beam.

2. Description of Prior Art

Presently known aimable spotlights normally use a collimating lens with a light source, such as the emitting end of a fiber-optic light guide, at the focus of the lens. The emitted beam is normally on an optical axis from the center of the light source through the optical center of the lens.

Aiming the beam of presently-known prior-art spotlights is usually accomplished by aiming the housing holding the light source and the lens. There are many prior-art methods for aiming a such light beams. The first method is by pivotally mounting the housing on the horizontal axis of a yoke, and then rotating the yoke about a vertical axis, forming an azimuth-elevation, or "AZ-EL" mount, such as is shown in the Applicant's U.S. Pat. No. 4,822,292. A second method for aiming a spotlight is by attaching it to a movable or flexible arm, known as a "goose-neck" mount, such as is shown in the Applicant's U.S. Pat. No. 3,652,848. All of the above methods require the entire luminaire to be within the room in which they are mounted. A third method for aiming a light beam is to rigidly mount the housing and provide a mirror on an azimuth-elevation mirror, such as is shown in the Applicant's U.S. Pat. No. 5,303,125. This is an aesthetic improvement that moves the housing above the ceiling plane, but still requires and element, i.e., the mirror, to hang down from the ceiling. A fourth method makes the housing substantially spherical, fitting it within a spherical ring-shaped support socket, forming what is generally called an "eyeball" mount, such as is shown of U.S. Pat. No. 5,050,067. This approach can substantially recess the housing, but it makes the luminaire about three times the diameter of the actual lens. The primary disadvantages in all the prior-art methods for aiming light fixture beams is that they are generally complex, expensive and unattractive.

OBJECTS AND ADVANTAGES

The primary object of the present invention is to provide a small, aimable spotlight luminaire, particularly for fiber-optic light guides, that may be entirely recessed into a surface, such as a ceiling into which the lens is fixed, and in which the beam may be aimed without moving part of the luminaire below the ceiling surface. The primary advantage of such a luminaire is the clean appearance of having only the lens and a thin, surrounding bezel being seen, with no visible arm, gooseneck, trunnion, eyeball and socket or even a mirror protruding into the room. Another advantage is simplicity and low cost of manufacture.

BRIEF DESCRIPTION OF THE DRAWINGS

FIG. 1 is a side partial cross-sectional view of a prior art fiber-optic eyeball spotlight luminaire shown mounted in a ceiling;

FIG. 2 is a side cross-sectional view of the luminaire of FIG. 1

FIG. 3 is a side elevation view of an aimable fiber-optic spotlight luminaire according to the invention, shown mounted in a ceiling; and

2

FIG. 4 is a side cross-sectional view of the luminaire of FIG. 3.

REFERENCE NUMERALS IN THE DRAWINGS

| | | | |
|---|---|---|---|
| 1 | prior-art spotlight | 21 | aimable spotlight |
| 2 | light guide | 23 | light source retainer |
| 3 | housing | 24 | light guide |
| 4 | spherical body | 25 | housing |
| 5 | mounting | 26 | locking chuck |
| 6 | planar ceiling | 27 | compression collet |
| 8 | conical arc | 28 | retaining nut |
| 9 | beam | 29 | emitted beam |
| 11 | light-emitting end | 30 | slot |
| 11a | light-emitting end moved | 33 | lock ring |
| 11f | focal plane | 34 | flange |
| 12 | lens | | |

DETAILED DESCRIPTION OF THE DRAWINGS

In FIG. 1 a typical prior-art fiber-optic spotlight luminaire 1 is shown having a light-emitting fiber-optic light guide 2 disposed in a housing 3 having a spherical body 4 adjustably mounted within a mounting 5, mounted in a planar structure 6, shown as a ceiling panel. Housing 3 is free to swivel within a conical arc 8 to position an emitted beam 9 anywhere within an off-axis angle A to aim the light beam.

In FIG. 2 the typical prior art luminaire 1 of FIG. 1 is shown with the light emitting end 11 of light guide 2 positioned to emit light through a lens 12 to produce beam 9, aimable anywhere within off-axis angle A.

In FIG. 3 the side elevation view of an aimable fiber-optic spotlight luminaire 21 according to the invention is shown having a light-emitting fiber-optic light guide 2, receiving light from a remote source which is not shown. Light guide 24 is disposed within light-source retainer 23 which is transversely adjustable to shift off a central axis 24 within a housing 25. Housing 25 may be rotated in any azimuth direction, whereby an emitted beam 29 by the transverse adjustment of light-source retainer 23 and the rotation of hosing 25 can aim the light beam 29 anywhere within off-axis angle A.

In FIG. 4 the side elevation view of FIG. 3 is shown as a cross-sectional view of the aimable fiber-optic spotlight luminaire 21, wherein fiber-optic light guide 2 has its light-emitting end 11 positioned off the optical axis 24 of a lens 23 and in an approximate focal plane 11f of lens 32. Light source retainer 23 includes a tubular retainer 22 which retains fiber 2 with a compression collet 27 tightened by a locking chuck 26. Light source retainer 23 is transversely adjustable by loosening a retaining nut 28, sliding stem 22 transversely in a slot 30 in proximal end 31 of housing 25 to shift fiber 2 off optical axis 24, and re-tightening nut 28; whereby emitted beam 29 may be aimed by the transverse adjustment of light-source retainer 23 and the rotation of housing 25 anywhere within off-axis angle A. This produces the function of swiveling beam 29 in a conical pattern equivalent to that of the eyeball luminaire of FIG. 1, but with housing 25 rotatable in the ceiling 6 by loosening a lock ring 33 which is threadably engaged with housing 25 and applies a holding force on planar structure 6 with flange 34.

OPERATION

In operation, an aimable fiber-optic spotlight luminaire according to the invention the housing and lens are fixed on a central optical axis through the lens and housing, mounting in a planar surface such as a ceiling or cabinet top. A light-emitting fiber-optic light guide receives light at a first end from a remote light source and emits light from a second end within the housing. A tubular light guide retainer holds the light-emitting light guide second end. The tubular retainer and light guide end are transversely adjustable in a slot within the housing to move the light emitting end of the light guide off the central axis lens and housing, causing the beam formed by the lens to be aimed in elevation off the central axis. The housing may be rotated in any azimuth direction, whereby an emitted beam can be aimed anywhere within the cone subtended by the rotation of the maximum off-axis angle of the light beam projected by the lens. The tubular retainer permits axial adjustment of the end of the light guide with respect to the lens, whereby the light beam can be zoomed from a smaller beam angle to a larger beam angle.

We claim:

1. An aimable-beam fiber optic spotlight luminaire including:

- a generally cylindrical tubular housing having a proximal end, a distal end and an optical axis therethrough;
- a lens on the optical axis at the distal end of the housing and having a focal plane within the housing;
- a fiber-optic light guide having a first end receiving light from a remote source of illumination and a second light-emitting end within the housing approximately at the lens focal plane;
- a light guide retainer for holding the light-emitting end of the light guide at the proximal end of said housing, said retainer having means for transverse adjustment off the optical axis whereby the lens projects a light beam at an off-axis elevation angle with respect to the optical axis of the lens and housing;
- means for rotatably mounting the housing in a planar structure whereby an off-axis beam projected by the lens is aimed in azimuth.

2. An aimable-beam fiber optic spotlight luminaire according to claim 1 in which the light guide retainer includes means for axially positioning the light-emitting light-guide end with respect to the lens.

3. An aimable-beam fiber optic spotlight luminaire according to claim 2 in which the means for axially positioning the light-emitting light-guide end with respect to the lens focal plane is a compression collet tightened by a locking chuck.

4. An aimable-beam fiber optic spotlight luminaire according to claim 1 in which means for supporting and rotating the housing is an enlarged flange on one side of the planar structure and a threadably-engaged nut on the other side.

* * * * *